(12) United States Patent
Watabe et al.

(10) Patent No.: US 7,937,721 B2
(45) Date of Patent: May 3, 2011

(54) OPTICAL DISC APPARATUS INCLUDING AIRFLOW COOLING MECHANISM

(75) Inventors: Kenji Watabe, Yokohama (JP); Ikuo Nishida, Ebina (JP); Yoichi Narui, Matsudo (JP); Masahiro Matsuo, Tokyo (JP); Takayuki Fujimoto, Tsuchiura (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 776 days.

(21) Appl. No.: 11/905,398

(22) Filed: Sep. 28, 2007

(65) Prior Publication Data

US 2008/0184279 A1 Jul. 31, 2008

(30) Foreign Application Priority Data

Jan. 29, 2007 (JP) ................. 2007-017642

(51) Int. Cl.
*G11B 33/14* (2006.01)
*G11B 17/03* (2006.01)
(52) U.S. Cl. ......... 720/649; 720/601; 720/659; 720/689
(58) Field of Classification Search ................ 369/121; 720/601, 603, 611–613, 648, 649, 651, 652, 720/655
See application file for complete search history.

(56) References Cited

U.S. PATENT DOCUMENTS

2003/0123367 A1* 7/2003 Lai et al. .................... 369/77.1
2005/0237868 A1* 10/2005 Nabe et al. ................ 369/44.11

FOREIGN PATENT DOCUMENTS

| JP | 2000-231782 | | 8/2000 |
|---|---|---|---|
| JP | 2004-310883 | | 11/2004 |
| JP | 2005-327347 | | 11/2005 |
| JP | 2006079752 | A * | 3/2006 |
| JP | 2006-107602 | | 4/2006 |

OTHER PUBLICATIONS

Machine-Assisted Translation of JP 2005327247 A.*
Machine-Assisted Translation of JP 2006079752 A.*

* cited by examiner

*Primary Examiner* — Wayne R Young
*Assistant Examiner* — Nathan A Danielsen
(74) *Attorney, Agent, or Firm* — McDermott Will & Emery LLP

(57) ABSTRACT

An optical disc apparatus, comprising a tray 2, attached to be insertable within housings 9 and 10, and within the housings are included a disc motor 3, an optical pickup 4 and a moving mechanism thereof, and also a unit mechanism chassis 5 for moving the optical pickup thereon and a controller substrate 71 disposed below the unit mechanism chassis for controlling the optical pickup, and further, a wide-width flexible cable 8 for electrical connection between the controller substrate and the optical pickup, wherein the optical pickup mounts laser units 41, 42 and 43 including three (3) pieces of elements, each emitting a laser light different in the wavelength thereof, a penetrating portion 2b and a wall portion 2e are provided in a part of left bottom surface of the tray, while forming a cutoff portion 55 in a part of the chassis, thereby guiding the airflow generated accompanying with rotation of the optical disc onto the optical pickup, with certainty.

6 Claims, 4 Drawing Sheets

AIRFLOW DUE TO DISC ROTATION

OPTICAL DISC APPARATUS INCLUDING AIRFLOW COOLING MECHANISM

BACKGROUND OF THE INVENTION

The present invention relates to an optical disc apparatus for recording or reproducing information, onto a disc-like recording medium (i.e., an optical disc) for optically recording information thereon, and it relates, in particular, to a heat radiation technology of an optical pickup in such the optical disc apparatus.

In general, within the optical disc apparatus for recording/reproducing information onto/from the optical disk, a large amount or volume of heat is generated from a semiconductor laser device (i.e., a laser diode) for generating a laser beam for recording, and also from a laser driver circuit for driving that semiconductor laser device, in particular, when recording onto that optical disc. For that reason, cooling is conducted upon the optical pickup, which mounts therein the semiconductor laser device and the driver circuit thereof, with utilizing airflow accompanying with rotation of the optical disc. Thus, with using a viscosity flow of the air, which is generated by the rotation of the disc, the air is blown upon the optical pickup, directly, through a first penetrating portion provided in a tray, thereby radiating the heat generated from the semiconductor laser device and the driver circuit thereof, both building up the optical pickup.

Also, as other conventional technology, the following technique is already known to be a heat radiation method, not dependent upon the first penetrating portion mentioned above which is provided in the tray.

First, in the following Patent Document 1 is disclosed the structures of providing air suction structures located above the optical disk, which is loaded and stored within a housing, for letting the air below the optical disc to flow into, and further for building up a discharge opening, i.e., a second penetrating portion, which is provided in a deep or bottom portion of the tray on the left-hand side thereof, so as to make up a pair openings, and thereby generating a convection between the upper portion and the lower portion of the tray, within the optical disk apparatus, in order to achieve the heat radiation, while circulating the heat generated from the optical pickup and/or a main board.

Also, in the following Patent Document 2 is disclosed the structures of providing a penetrating portion at a depth or bottom of the tray at the center thereof, so as to send or transfer the viscosity flow of the air generated by rotation of the disc into a lower portion of the tray, and thereby letting to radiate the heat generation of a main board through the convection of the viscosity flow.

[Patent Document 1] Japanese Patent Laying-Open No. 2006-107602 (2006); and

[Patent Document 2] Japanese Patent Laying-Open No. 2004-310883 (2004).

BRIEF SUMMARY OF THE INVENTION

On the other hand, as the optical discs, i.e., the information recording media, not only the conventional CD and DVD, but also BD is also widely used, newly in recent years, and accompanying with this, it is required for the optical disc apparatus to be compatible with such BD, as well as, the CD and the DVD, i.e., to comprise three (3) kinds (or, three (3) wavelengths) of laser light sources therein. However, within such the optical disc apparatus being compatible with such three (3) wavelengths, there are mounted three (3) kinds (or, three (3) wavelengths) of semiconductor laser devices, and also the respective driver circuits thereof, as well, on the optical pickup. And accompanying therewith, further, a flexible cable (hereinafter, being abbreviated by "FFC") for connecting between that optical pickup and the main board, comes to be wide in width thereof, in particular, due to a great increase of the number of connection wires thereof.

Thus, within such the optical disc apparatus being compatible with three (3) wavelengths, although an increase is made of the number of the heat generation sources, on the optical pickup thereof, due to the mountings of the semiconductor laser devices of three (3) kinds (or, three (3) wavelengths), but on the other hand, since the airflow is prevented from being circulated within that apparatus, in particular, due to standing of the wide-width FFC covering over that optical pickup, therefore there is caused a problem that it comes to be difficult to sent or transfer the airflow, fully or sufficiently, onto the optical pickup, accompanying with the rotation of the optical disc, only in accordance with the conventional arts mentioned above.

Then, according to the present invention, by taking the problems of the conventional arts mentioned above into the consideration thereof, i.e., an object of the present invention is to provide an optical disc apparatus for enabling to achieve the heat radiation of the optical pickup, by means of the airflow generated accompanying with the rotation of the optical disc, with certainty, also within the optical disc apparatus, mounting on three (3) kinds (or, three (3) wavelengths) of semiconductor laser devices and the respective driver circuits thereof, and further comprising an optical pickup, which is disposed to be connected with the wide-width FFC.

According to the present invention, for accomplishing the object thereof, first of all, there is provided an optical disc apparatus, comprising: a housing; and a tray, which is attached within said housing, so that it can be inserted therein, wherein within said housing are included: a rotation driver portion, which is configured to load an optical disc thereon, so as to rotationally drive it at a predetermined rotation speed; an optical pickup, which is configured to record information by irradiating a laser light on a recording surface of said optical disc, or to reproduce recorded information by means of a reflection light thereof; a mechanism portion, which is configured to move said optical pickup in a radial direction of said optical disc loaded into said apparatus; and also a chassis portion, which is configured to be formed with a penetrating portion for moving said optical pickup therethrough; a controller substrate, which is configured to dispose below said chassis portion and to comprise a controller portion therein; and a wide-width flexible cable, which is configured to achieve electrical connection between said controller substrate and said optical pickup, wherein said optical pickup mounts at least three (3) pieces of laser light emitting portions, each including an element for emitting a laser light differing in wavelength, in one body, a passage is defined for guiding an airflow generated accompanying with rotation of said optical disc below said tray, in a part of a left bottom surface of said tray, and a cutoff portion is formed in a part of said chassis portion, so that said tray is located below said penetrating portion and said passage under condition where said tray is stored within the housing of said apparatus, thereby guiding the airflow guided below through said passage onto said at least three (3) sets of laser light emitting portions built in said optical pickup in one body, irrespective of disposition of said wide-width flexible cable.

According to the present invention, it is possible to provide an optical disc apparatus for enabling to radiate the heat generated from an optical pickup, by using an airflow accompanying with rotation of the optical disc.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
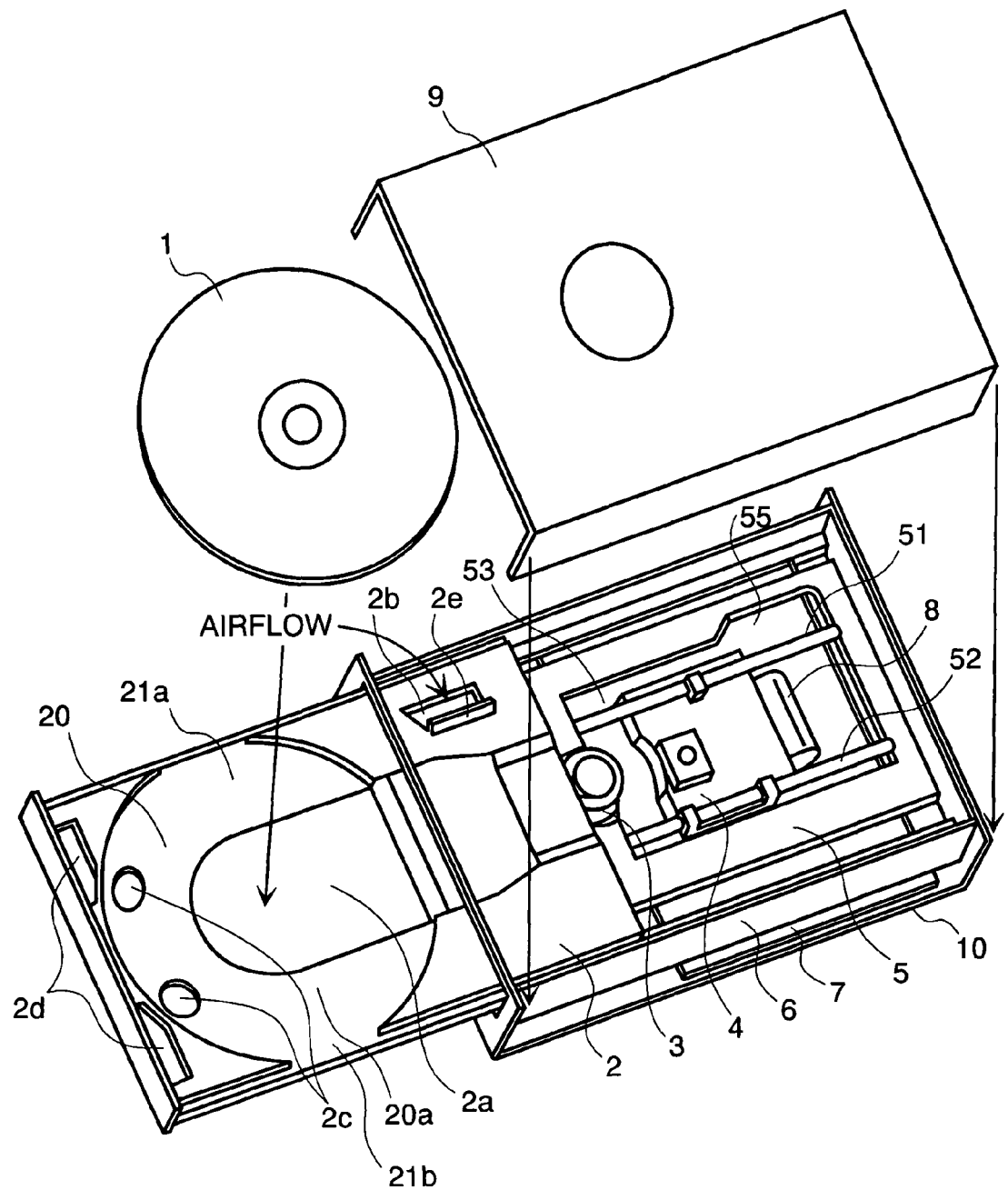
FIG. 1 is an exploded perspective view, for showing the entire structures of an optical disc apparatus, according to an embodiment of the present invention.

FIG. 1 attached herewith is an outlook view of an optical disc apparatus, according to one embodiment of the present invention, and in this figure, a reference numeral 1 depicts an optical disc. i.e., a disc-like recording medium for optically recoding information thereon by means of that optical disc apparatus, wherein that optical disc 1 is loaded on a disc transfer member (i.e., a tray) 2, building up a portion of the optical disc apparatus, and it is transferred into an inside of that apparatus. Further, at around the central portion of this disc transfer member (i.e., the tray) 2 is formed a first penetrating portion 2a, and further in a front side thereof are formed front-side penetrating portions 2c and 2d, symmetrically on both sides thereof. In addition thereto, at a bottom of the left-hand side of this disc transfer member (i.e., the tray) 2 is formed a second penetrating portion 2b, as well as, a wall portion 2e extending from the right-end portion of the penetrating portion 2b to the above, and thereby building up a flow passage for an airflow accompanying with rotation of the disc 1 to flow therein. Further, a reference numeral 20a in the figure depicts a disc loading plane portion, and 21a and 21b disc loading cutoff portions, respectively.

Also, a reference numeral 3 in the figure depicts a disc motor, i.e., a rotation apparatus for rotationally driving the optical disc 1 mentioned above, 4 an optical pickup, a 5 a unit mechanism chassis including the above-mentioned optical pickup 4 therein, 6 a unit chassis including the above-mentioned unit chassis therein, and 7 a circuit board attached with various kinds of controller substrates thereon, respectively. Further, as is apparent from the figure, between the optical pickup 4 and the circuit board 7 mentioned above is attached a flexible cable (i.e., FFC) of wide width, for electrically connecting those. Also, a reference numeral 9 depicts an upper cover of housing of that optical disc apparatus, and a reference numeral 10 a lower cover of the housing, respectively.

However, within the optical pickup 4 mentioned above, as is shown in FIG. 3 below, the followings are built up therein; i.e., the three (3) kinds of laser diodes (i.e., laser light emitting elements) and the respective driver circuits thereof (shown by reference numerals 41, 42 and 43 in FIG. 3), each being different in the wavelength of the laser light emitted therefrom, and also, a lens of an optic system, but not shown in the figure herein, a temperature detecting means, and mechanisms for exchanging those three (3) kinds of laser diodes therewith. Explaining the more details thereof, this optical pickup 4 mounts a laser diode for generating a laser beam (wavelength: 785 nm) for use of CD, for recording/reproducing CD, a laser diode for use of DVD (wavelength: 660 nm), and further in addition thereto, a laser diode for generating a blue-color laser beam (wavelength: 405 nm) for use in Blu-ray Disc (registered mark) and a HD DVD (registered mark), so as to enable recording/reproducing of the Blu-ray Disc and the HD DVD, as well as, those conventional CD and DVD.

And, the optical pickup 4 mentioned above is attached to be movable along a pair of guide shafts (or, guide bars) 51 and 53, which are attached on the unit mechanism chassis 5 mentioned above, and it is moved in the direction shown by an arrow within the figure (i.e., in the radial direction of the optical disc 1 loaded into the apparatus), by means of a moving mechanism, including a driving motor not shown in the figure herein. And, as will be also mentioned later, on this unit mechanism chassis 5 are provided a cutoff portion 55 for defining a flow passage of an airflow, at the position locating below the above-mentioned penetrating portion 2b and the wall portion 2e when the disc transfer member (i.e., the tray) 2 is in the condition of being received or stored within an inside of the housings 9 and 10 of that apparatus.

Figure 2:
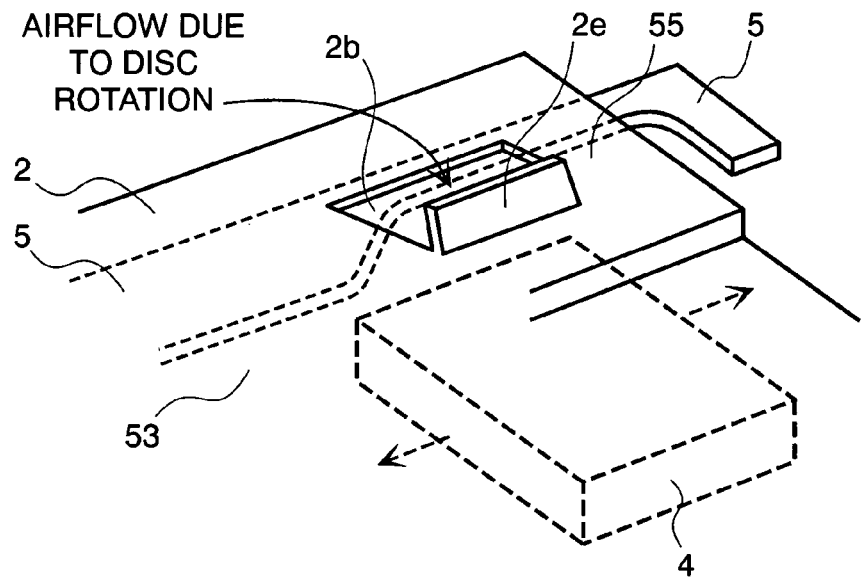
FIG. 2 is an enlarged perspective view in the vicinity of a flow passage built up with a second penetrating portion, which is formed on a disc transfer member (or a tray), in the optical disc apparatus mentioned above.

Following to the above, detailed explanation will be made herein, in particular, on heat radiation (i.e., cooling) of the optical pickup within the optical disc apparatus, the detailed structures of which were explained in the above, by referring to FIGS. 2 and 3 attached herewith. However, this FIG. 2 is an enlarged perspective view, in particular, of vicinity of the flow passage defined by the second penetrating portion 2b and the wall portion 2e, which are formed at the bottom of the left-hand side of the above-mentioned disc transfer member (i.e., the tray) 2, in the optical disc apparatus shown in FIG. 1 mentioned above, and FIG. 3 is a perspective view when seeing those from a lower side of the apparatus, including the wide-width flexible cable (FFC) 8 connected between the controller substrate 71 mounted on the circuit board 7 and the above-mentioned unit mechanism chassis 5 therein, i.e., around the optical pickup 4 within the optical disc apparatus mentioned above.

Further, within the optical disc apparatus having such the structures mentioned above therein, through operation upon an eject button not shown in the figure herein, for example, the disc transfer member (i.e., the tray) 2 is discharged from the front surface of the housings 9 and 10 of the apparatus, so as to load the optical disc 1 on the disc loading plane portion 20a of that discharged tray 2, and thereafter, that disc transfer member (i.e., the tray) 2 is inserted into an inside of the apparatus. With this, the disc motor 3 mentioned above goes up to mount the optical disc 1 on a turntable attached at a tip thereof, in order to rotationally drive that disc at a predetermined rotation speed, and then recording/reproducing of information is made upon the information recording surface thereof, with using the laser light corresponding to the kind (i.e., CD, DVD, Blue-ray Disc, or HD DVD) of that optical disc loaded, while moving the above-mentioned optical pickup 4 in the radial direction of the optical disc 1.

In that instance, the airflow accompanying with rotation of the optical disc 1 (i.e., due to the viscosity of the air), as is apparent from those figures, i.e., it flows from an upper surface of the disc transfer member (i.e., the tray) 2 into a lower surface thereof, through the penetrating portion 2b and the wall portion 2e extending from the end at the right-hand side thereof to the above. Thereafter, the airflow flowing into the lower surface of this tray 2 further flows into a lower portion of the above-mentioned unit mechanism chassis 5, through the cutoff portion formed in a portion thereof.

Figure 3:
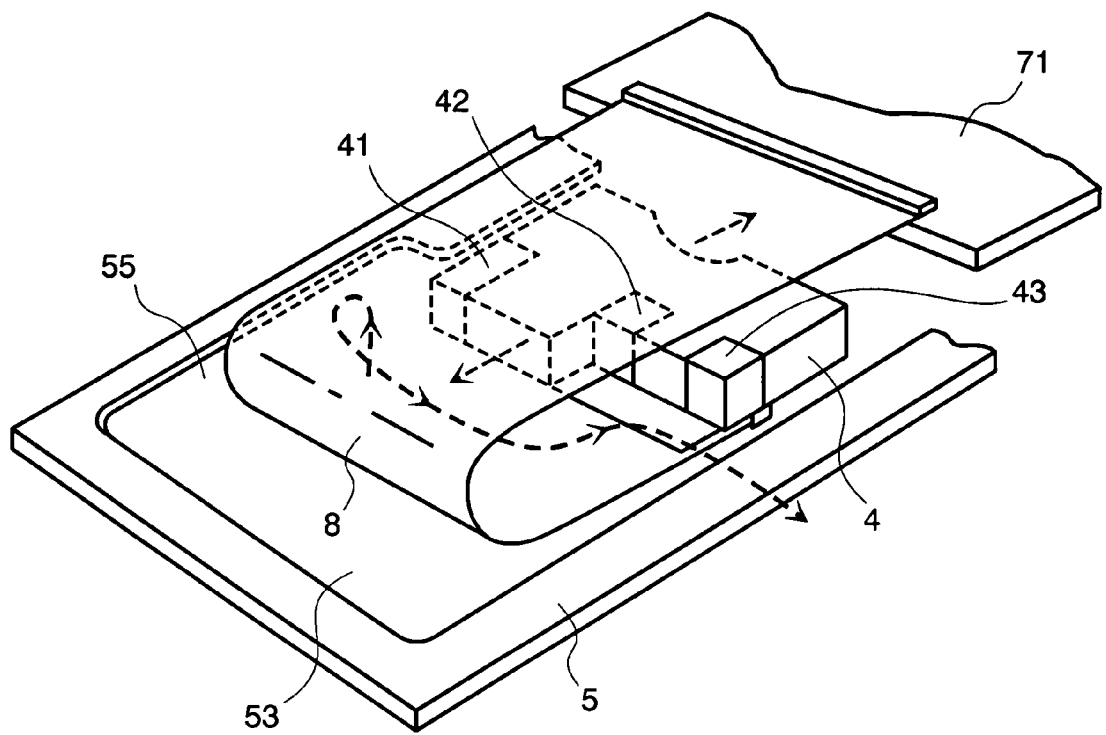
FIG. 3 is a perspective view of the apparatus, when seeing it from a lower side thereof, including a wide-width flexible cable (FCC) connected between a controller substrate and a unit mechanism chassis therein, mainly around an optical pickup of the optical disc apparatus mentioned above.

Thereafter, the airflow, flowing into the lower surface of the tray 2, and further into the lower portion of the unit mechanism chassis 5, as was mentioned above, flows passing through a gap of the wide-width flexible cable (FFC) 8, which is disposed to cover the periphery of the optical pickup 4 building therein a plural number of the semiconductor laser devices, i.e., the heat-generation elements, and the driver circuits thereof (three (3) sets, 41, 42 and 43, in this example), as is shown by an arrow in FIG. 3 attached (i.e., the perspective view from the lower side thereof). Thus, the airflow flows along the surfaces of the semiconductor laser devices and the driver circuits thereof (hereinafter, each being called a "laser unit") 41, 42 and 43, which are disposed at a plural number of positions on the periphery of the optical pickup 4. And, in that instance, each of the laser units 41, 42 and 43 radiates heat of the heat-generations thereof into the airflow, through a cooling fin formed on the surface thereof or the like, and therefore it is possible to conduct the cooling on the optical pickup 4.

Further, within the optical disc apparatus for recording/reproducing information onto/from the recording surface thereof, in particular, corresponding to the various kinds of optical discs, including CD, DVD, Blue-ray Disc and HD DVD, three (3) kinds (or, three (3) wavelengths) of semiconductor laser devices, as well as, the respective driver circuits thereof, are mounted on the optical pickup 4, and accompanying with that, also the FFC 8 for connecting between that optical pickup and the main substrate comes to be wide, i.e., accompanying with a great increase of the number of connection wires (i.e., being near to the width of the penetrating portion 53, which is formed at the central portion of the unit mechanism chassis 5 mentioned above, for example, being narrow only by 2-4 mm comparing to the penetrating width), thereby standing to cover that optical pickup. For that reason, as was mentioned above, that wide-width FFC 8 prevents the said airflow from blowing upon the optical pickup 4, even if guiding the airflow accompanying with rotation of the optical disc 1 below the tray 2 by means of the penetrating portion 2b and the wall portion 2e mentioned above.

However, with the structures mentioned above, according to the one embodiment of the present invention, for the purpose of defining the flow passage for the airflow mentioned above, the cutoff portion 55 is provided in a portion of the unit mechanism chassis 5, which will be disposed adjacent with the wide-width FFC 8 standing to cover that optical pickup. Because of this, the airflow running into below the tray 2 passing through the penetrating portion 2b and the wall portion 2e mentioned above, flows into an inside of the FFC 8, which is bent in "U"-shape, from a side opening thereof, through the cutoff portion 55 of the unit mechanism chassis 5, and thereby flowing outside to the opposite side thereof, while passing by the plural number (i.e., three (3) pieces) of the laser units 41, 42 and 43, which are built within the optical pickup 4. With this, irrespective of disposition of the wide-width FFC 8 mentioned above, it is possible for each of the laser units 41, 42 and 43 to radiate that heat generation into the airflow, and thereby achieving effective conducting of the cooling on the optical pickup 4, with certainty.

Further, explanation will be made on the optical disc apparatus, according to other embodiment of the present invention, by referring to FIGS. 4 to 6 attached herewith.

Figure 4:
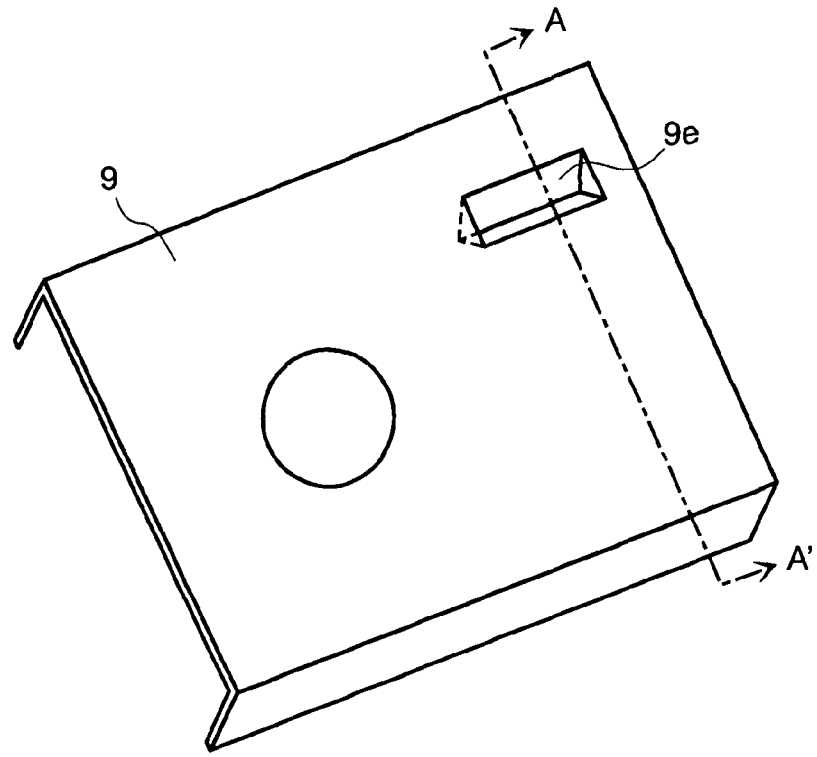
FIG. 4 is a perspective view of an upper cover of a housing, for explaining the optical disc apparatus, but according to other embodiments of the present invention.

Firstly, FIG. 4 is a perspective view of the optical disc apparatus according to the other embodiment, in particular, an upper cover of a housing thereof. Also, FIGS. 5(A) and 5(B) show A-A' cross-section in FIG. 4, and in particular in this example, a portion of the housing upper cover 9 of the optical disc apparatus (i.e., a portion corresponding to the wall portion 2e mentioned above) is projected downwards, for example, through the pressing process (or, cutting a part thereof to be bent), thereby defining a wall portion 9e, in the place of the wall portion 2e extending upwards from the right end of the penetrating portion 2b formed in a part of the surface of the tray 2 at the left-hand side bottom thereof, as was shown in FIGS. 1 and 2.

Figure 5A:
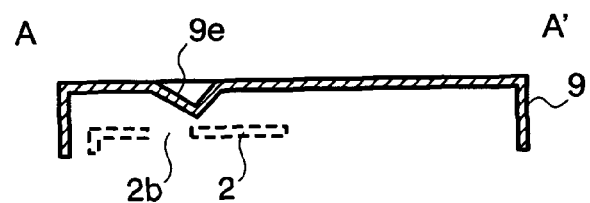
FIGS. 5(A) and 5(B) are views for showing the A-A' cross-sections of the upper covers of the housings mentioned above, respectively.
Figure 6:
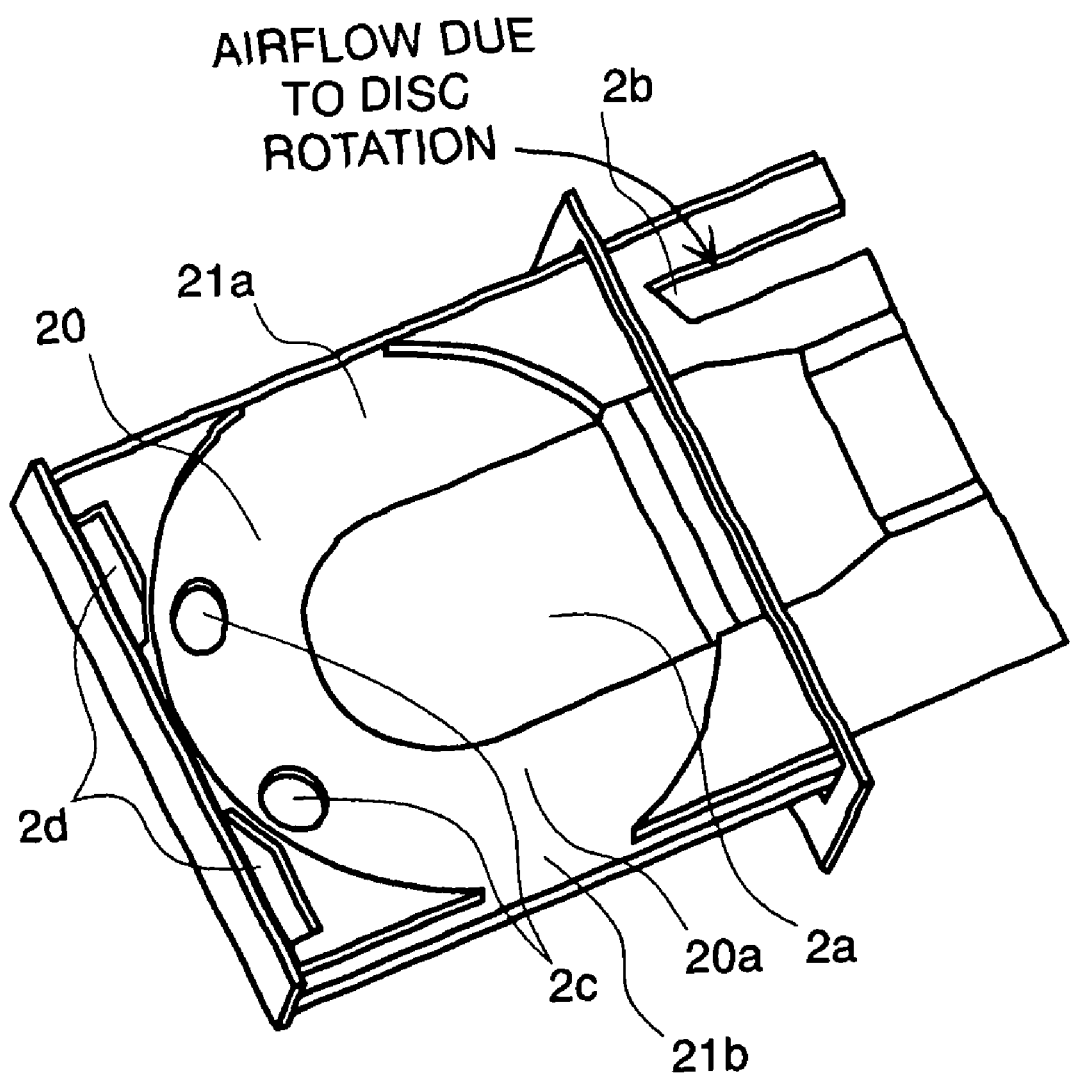
FIG. 6 is a perspective view of a tray, for explaining the optical disc apparatus according to further other embodiment of the present invention.

Thus, the housing cover 9 defining the above-mentioned wall portion 9e covers above the right end of the penetrating portion 2b of the tray 2, as is shown in FIG. 5(A), thereby letting the airflow accompanying with rotation of the optical disc 1 to flow from the upper surface down to the lower surface of the tray 2, in the similar manner to that of the wall portion 2e mentioned above. However, with such the structures, since it is possible to obtain the wall portion 9e, being higher than the wall portion 2e, which is formed in a part of the tray 2, therefore the airflow can flow into the lower surface, much more, and thereby increasing the heat-radiation effect, much more. Also, at the same time, only the penetrating portion is formed, but no necessity of defining the wall portion 2e mentioned above, in a part of the tray 2, therefore it is easy to manufacture the tray, and also possible to prevent the noises of the wind being cut by the wall portion 2e from being generated therefrom.

Figure 5B:
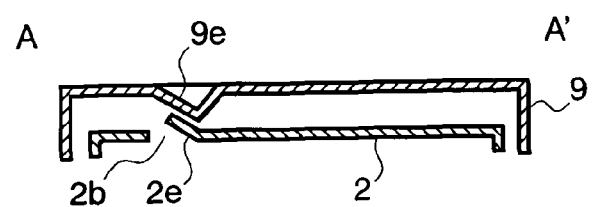

Or, alternately, in the place thereof, as is shown in FIG. 5(B) attached herewith, it is also possible to combine with the tray 2, on which the wall portion 2e is formed at the right end together with the penetrating portion 2b, thereby to define a flow passage for letting the airflow accompanying with rotation of the optical disc 1 to flow from the upper surface down to the lower surface of the tray 2.

Further, also regarding the penetrating portion 2b defined in apart of the tray 2 mentioned above, it should not be restricted to the configuration of the embodiment mentioned above, but for example, as is shown in FIG. 6 attached, the penetrating portion 2b may be further extended, such as, up to where it reaches to an end of the tray 2, for example. In this instance, it is possible to apply such structure that a tip of the wall portion 9e is engaged or fit with the penetrating portion 2e. In the similar manner to the above, this is because the airflow can flow into the lower surface, much more, and thereby increasing the heat-radiation effect, much more. And, it is also possible to prevent the noises of the wind being cut by the wall portion 2e from being generated therefrom.

However, according to the present invention, within the optical disc apparatus described in the above, it is preferable to build up the passage, for guiding the airflow below the above-mentioned tray, with the penetrating portion and the wall portion, which are formed on that tray, or the penetrating portion formed on that tray and the wall portion formed in a part of the housing mentioned above corresponding to that penetrating portion. Further, according to the present invention, the width of the wide-width flexible cable mentioned above is near to the width of the penetrating portion, which is formed in the chassis portion mentioned above, for moving the above-mentioned optical pickup therein, or the wide-width flexible cable mentioned above includes a plural number of wirings for use of controlling the elements mounted on the optical pickup, for emitting the laser lights different in the wavelengths, respectively. In addition thereto, it is preferable that, each of the laser light emitting portions, which are mounted on the optical pickup mentioned above, has the above-mentioned laser light emitting element and the driver circuit for driving that element, respectively, and further that the laser light emitting elements include those for emitting the laser lights corresponding to CD, DVD, Blu-ray Disc and HD DVD.

According to the present invention mentioned above, it is possible to obtain a superior effect of providing the optical disc apparatus for achieving the heat radiation of the optical pickup by means of the airflow accompanying with rotation of the optical disc, with certainty, even within the optical disc apparatus, mounting a plural number (i.e., three (3) wavelengths) semiconductor laser devices and the driver circuits thereof, accompanying with an increase of kinds of the optical discs compatible, and also having the optical pickup being connected with the wide-width FFC disposed therein.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus, comprising:
   a housing; and
   a tray, which is attached within said housing, so that it can be inserted therein, wherein within said housing are included:
   a rotation driver portion, which is configured to load an optical disc thereon, so as to rotationally drive it at a predetermined rotation speed;
   an optical pickup, which is configured to record information by irradiating a laser light on a recording surface of said optical disc, or to reproduce recorded information by means of a reflection light thereof;
   a mechanism portion, which is configured to move said optical pickup in a radial direction of said optical disc loaded into said apparatus; and also a chassis portion, which is configured to be formed with a penetrating portion for moving said optical pickup therethrough;
   a controller substrate, which is configured to dispose below said chassis portion and to comprise a controller portion therein; and
   a wide-width flexible cable, which is configured to achieve electrical connection between said controller substrate and said optical pickup, wherein:
   said optical pickup mounts at least three (3) pieces of laser light emitting portions, each including an element for emitting a laser light differing in wavelength, in one body,
   a passage is defined for guiding an airflow generated accompanying with rotation of said optical disc below said tray, in a part of a left bottom surface of said tray,
   a cutoff portion is formed in a part of said chassis portion, so that said penetrating portion is located below said passage under a condition where said tray is stored within the housing of said apparatus, thereby guiding the airflow guided below through said passage onto said at least three (3) sets of laser light emitting portions built in said optical pickup in one body, irrespective of disposition of said wide-width flexible cable, and
   a width of said wide-width flexible cable is near to a width of said penetrating portion, which is formed in said chassis portion for moving said optical pickup therethrough.

2. The optical disc apparatus, as described in the claim 1, wherein said passage for guiding the airflow below said tray is made up with a penetrating portion and a wall portion, which are formed on said tray.

3. The optical disc apparatus, as described in the claim 1, wherein said passage for guiding the airflow below said tray is made up with a penetrating portion, which is formed on said tray, and a wall portion, which is formed in a part of said housing corresponding to said penetrating portion.

4. The optical disc apparatus, as described in the claim 1, wherein said wide-width flexible cable includes a plural number of wirings for controlling the laser light emitting elements mounted on said optical pickup, each emitting the laser light different in the wavelength, separately.

5. The optical disc apparatus, as described in the claim 4, wherein each of the laser light emitting portions mounted on said optical pickup has said laser light emitting element and a driver circuit for driving said element, respectively.

6. The optical disc apparatus, as described in the claim 5, wherein said laser light emitting elements includes ones for emitting laser lights corresponding to CD, DVD, Blu-ray Disc, and HD DVD, respectively.

* * * * *